ived July 2, 1957

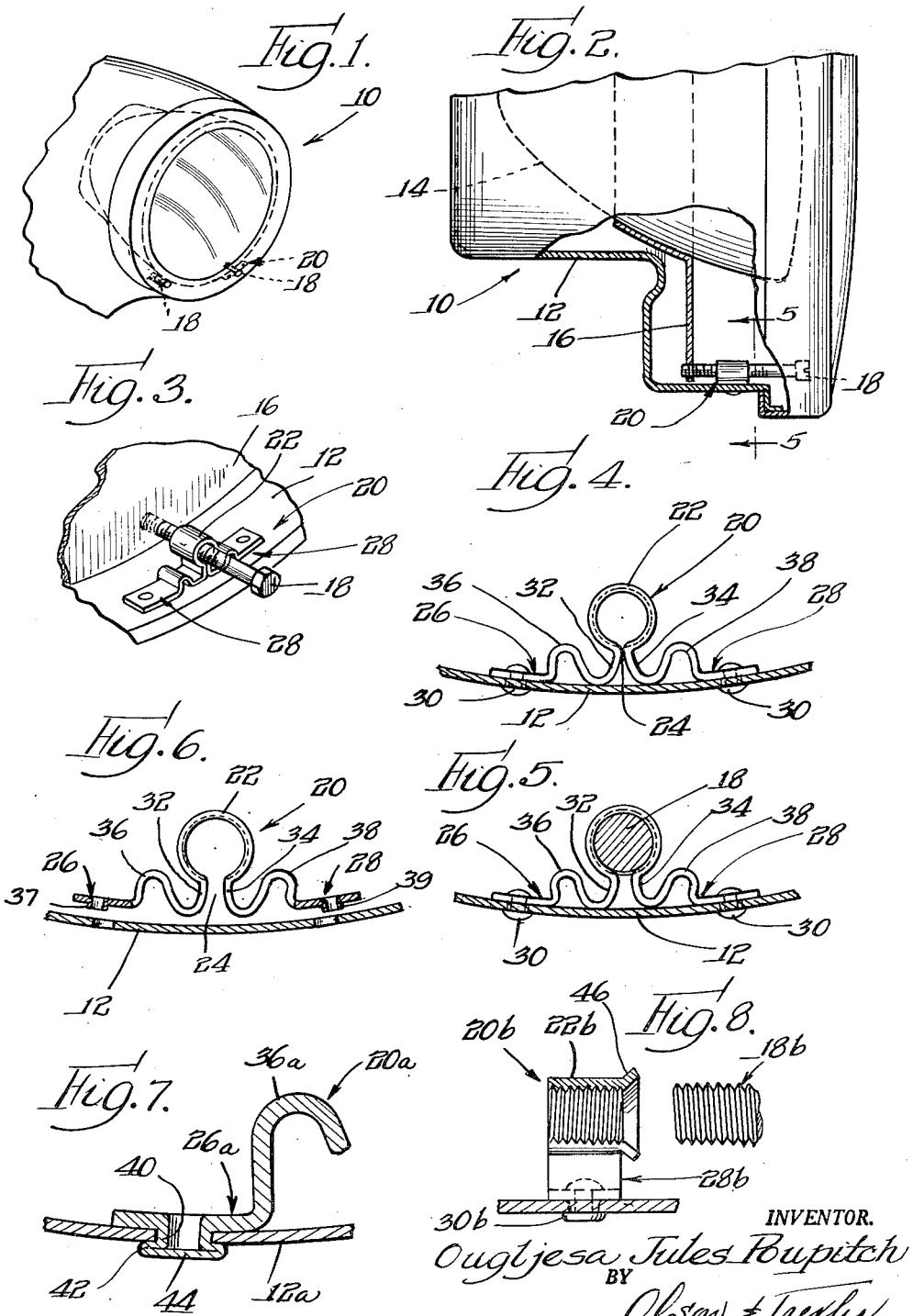

2,797,606

SHEET METAL NUT HAVING FLEXIBLE LOOP PORTIONS

Ougljesa Jules Poupitch, Itasca, Ill., assignor to Illinois Tool Works, Chicago, Ill., a corporation of Illinois Application April 14, 1954, Serial No. 423,054

3 Claims. (Cl. 85—32)

The present invention relates to a structure including a novel fastener member and more particularly to a novel nut-like member adapted to receive a threaded screw or the like.

While various uses for the novel fastener member of the present invention will suggest themselves, the fastener member is especially useful for receiving a screw of a lamp structure and more particularly for receiving a screw which adjustably mounts an electric lamp within the shell of an automobile headlight structure or the like. It is necessary that the nut means for receiving such mounting screws be adapted to lock the screw in any adjusted position and also be adapted to shift laterally so that a plurality of screws may be readily aligned with apertures in a common bracket or other workpiece and with their respective nut means. In the past such mounting and adjusting screws have been connected with the shell of a headlight structure or the like by means of a relatively complicated and expensive nut member which in turn is loosely connected to the shell by a separate nut cage. Such prior nut members and nut cages are not only relatively difficult and expensive to manufacture but they are also relatively difficult to assemble together and to the headlight shell so that the ultimate manufacturing cost of the headlight is excessive.

It is a primary object of the present invention to provide a novel nut member for receiving and retaining a screw in any desired adjusted position, which nut member is of relatively simple and economical construction and may be easily applied to a workpiece such as a headlight shell.

A more specific object of the present invention is to provide a novel nut member of the above described type which may be economically manufactured from a single piece of sheet material.

A further object of the present invention is to provide a novel one-piece sheet material nut member of the above described type which effectively locks or retains a screw member in any desired adjusted position and which is laterally shiftable when mounted to a workpiece to permit a screw member to be aligned therewith or to permit a screw member extending therethrough to be aligned with a work piece.

Other objects and advantages of the present invention will become apparent in the following description and the accompanying drawings, wherein:

Fig. 1 is a perspective view illustrating a headlight structure embodying the principles of this invention;

Fig. 2 is an enlarged fragmentary side elevational view of a headlight structure embodying the principles of this invention;

Fig. 3 is an enlarged fragmentary perspective view of an assembly including the novel nut member of the present invention;

Fig. 4 is a cross sectional view showing the novel nut member of the present invention applied to a workpiece such as the shell of a head lamp structure;

Fig. 5 is an enlarged fragmentary cross sectional view taken along line 5—5 in Fig. 2;

Fig. 6 is an exploded cross sectional view showing the relationship between a nut member of this invention and a work piece before assembly;

Fig. 7 is an enlarged fragmentary cross sectional view of a modified form of the present invention wherein the novel nut-like member is provided with integral means adapted to be interconnected with a workpiece; and Fig. 8 is a cross sectional view of a modified form of the present invention wherein the nut-like member is provided with an enlarged mouth for facilitating the reception of a screw member.

Referring now more specifically to the drawings wherein like parts are designated by the same numerals throughout the various figures, a headlight structure 10 embodying the principles of this invention is illustrated best in Figs. 1 and 2. In general, this structure includes a shell or housing 12 enclosing a suitable lamp 14. The lamp is supported by a bracket 16 which in turn is adjustably supported by a plurality of screw members 18 extending through nut members 20 that are constructed in accordance with the present invention.

Each of the nut members 20 is formed from a single piece of sheet material, preferably resilient sheet metal, and includes a split cylindrical body portion 22 having axially extending margins spaced from each other as indicated at 24. Integral attaching wings 26 and 28 extend from the opposed space margins of the body portion and are provided with apertures adjacent their outer ends for receiving suitable means such as rivets 30, whereby the nut member may be readily mounted to the shell 12. The wings are respectively provided with laterally extending portions 32 and 34 for spacing the cylindrical body from the wall of the shell and looped portions 36 and 38. The free ends of the wings are adapted to conform to the surface of the workpiece whether the workpiece be a cylindrical shell as shown or a flat panel, not shown.

It will be appreciated that the sheet material nut member 22 may be formed economically by relatively simple stamping and bending operations after which the cylindrical body portion 22 is tapped to form threads for receiving the screw member. The nut member 20 is shown in an unstressed condition before assembly to the workpiece in Fig. 6 and it should be noted that in this condition the axial margins of the cylindrical body portion are spaced relatively far apart and the rivet receiving apertures in the wings 26 and 28 are spaced farther from each other than the rivet receiving apertures in the shell of the workpiece 12. In order to assemble the nut member with the workpiece the cylindrical body portion is collapsed as shown in Fig. 4 until the apertures in the wings align with the apertures in the workpiece. It should be noted that the wings are respectively provided with short extruded cylindrical protuberances 37 and 39 surrounding their rivet receiving apertures, which protuberances are adapted to enter the holes in the shell to facilitate initial assembly of the nut member with the shell while the nut member is in a collapsed condition. In this collapsed condition the internal diameter of the cylindrical body portion is less than the diameter of the screw member so that upon application of the screw member the cylindrical body portion is spread apart as shown best in Fig. 5. The laterally extending portions and the looped portions of the wing provide the nut member with sufficient flexibility to permit expansion of the cylindrical body portion for receiving the screw member and at the same time they resiliently urge the cylindrical body portion into tight engagement with the screw member, whereby the screw member is effectively retained or locked in any desired adjusted position. The laterally extending portions and the looped portions of the wings are also sufficiently flexible to permit lateral shifting of the entire cylindrical body portion so that a screw member passing through the cylindrical body portion may be brought into alignment with an aperture in a workpiece such as the bracket 16 of the headlight structure.

In Fig. 7 there is illustrated a portion of a nut member 20a which is identical to the above described nut member with the exception that integral means have been provided for securing the nut member 20a to the workpiece. Thus, instead of providing the wings of the nut member 20a with apertures through which a rivet may extend, integral protuberances are drawn from the material of the wings and are adapted to extend through the apertures in the workpiece for securing the nut member to the work piece. More specifically, an integral hollow protuberance 40 is drawn from the material of the free end of the wing 26a and is adapted to extend through the aperture in the workpiece as shown in Fig. 7. After the protuberance has been inserted through the workpiece aperture the free end thereof is upset as indicated at 42 to retain the nut member in assembled relationship with the workpiece. The protuberance 40 is preferably formed with a closed free end 44 since it is desirable to seal the headlight shell 12 against the entry of moisture, dust and the like. While only one wing of the nut member 20a has been illustrated it is understood that the opposite wing may also be provided with a protuberance substantially identical to the protuberance 40.

In Fig. 8 there is illustrated another slightly modified form of the present invention which includes a nut member 20b which is substantially identical to the above described nut member 20 as indicated by the application of identical numerals with the suffix b added to corresponding elements. In addition to the structure of the nut member 20, the nut member 20b includes an outwardly flaring section 46 at one end of the cylindrical body portion, whereby to provide the body portion with an enlarged mouth for facilitating the reception of the screw member. It should be understood that the nut member 20b may be secured to the workpiece by means of rivets or it may be provided with the integral securing means shown in Fig. 7.

From the above description it is seen that the present invention has provided a novel structure including a simple and highly efficient sheet material nut member for receiving and locking a screw, which nut member may be both economically manufactured and economically assembled with a workpiece such as a headlight shell. More specifically it is seen that the present invention has provided a novel nut member which may be economically manufactured from a strip of sheet material, preferably of uniform width, by simple bending and stamping operations. Furthermore, it is seen that even though the novel sheet material nut member of the present invention is of extremely simple construction it is adapted to lock a screw member effectively and to be laterally shiftable to permit ready alignment of a screw member extending therethrough with an aperture in a workpiece.

While the preferred embodiments of the present invention have been shown and described herein it is obvious that many structural details may be changed without departing from the spirit and scope of the appended claims.

The invention is claimed as follows:

1. A one-piece resilient sheet material nut member adapted to be secured to a work piece and to receive a screw member and adapted to restrain the screw member against inadvertent rotation, including a threaded cylindrical body portion having separated axially extending margins, and generally oppositely extending wings respectively integral with, and extending from, each of said margins, each of said wings having an attachment portion in the vicinity of their free ends with a flexible portion intermediate said margins and said attachment portions, said flexible portions including a generally S shaped configuration providing two loop portions intermediate the aforesaid margin and attaching portion to permit the opening and closing of said threaded cylindrical body portion independent of said attachment portion as a screw or the like is mounted or demounted therefrom, said loop portions being generally located intermediate a plane passing through the aforementioned attachment portions and a plane parallel thereto and passing through the axis of the cylindrical body portion of said nut member.

2. In a one-piece resilient sheet material nut member of the type described in claim 1, wherein each of said attachment portions are provided with integral rivet elements formed from the material of the attachment portion.

3. In a one-piece resilient sheet material nut member of the type described in claim 1, wherein the opening to the threaded cylindrical body portion is flared to facilitate the mounting of a screw threaded element therein.

References Cited in the file of this patent

UNITED STATES PATENTS

| | | |
|---|---|---|
| 1,726,532 | Andel | Sept. 3, 1929 |
| 1,798,812 | Rosenbeck | Mar. 31, 1931 |
| 1,994,428 | Keil | Mar. 28, 1935 |
| 2,111,653 | Winkelmeyer | Mar. 22, 1938 |
| 2,128,461 | Johnson | Aug. 30, 1938 |
| 2,152,197 | Levy | Mar. 28, 1939 |
| 2,261,369 | Henry | Nov. 4, 1941 |
| 2,328,587 | Simmons | Sept. 7, 1943 |
| 2,733,335 | Falge | Jan. 31, 1956 |

FOREIGN PATENTS

| | | |
|---|---|---|
| 682,578 | Great Britain | Nov. 12, 1952 |